United States Patent [19]

Merkle

[11] Patent Number: 4,493,481

[45] Date of Patent: Jan. 15, 1985

[54] PNEUMATIC SPRING FOR MOTOR VEHICLES

[75] Inventor: Josef Merkle, Esslingen, Fed. Rep. of Germany

[73] Assignee: Daimler-Benz AG, Fed. Rep. of Germany

[21] Appl. No.: 959,599

[22] Filed: Nov. 13, 1978

[30] Foreign Application Priority Data

Nov. 12, 1977 [DE] Fed. Rep. of Germany ....... 2750667

[51] Int. Cl.³ .......... B60G 11/26; F16F 3/00; F16F 9/04
[52] U.S. Cl. .............. 267/64.27; 267/64.24; 267/64.25
[58] Field of Search .......... 267/65 R, 65 A, 65 B, 267/35, 64.11–64.28; 280/711

[56] References Cited

U.S. PATENT DOCUMENTS

| | | | |
|---|---|---|---|
| 2,846,983 | 8/1958 | Otto | 267/65 B |
| 2,933,308 | 4/1960 | McGavern et al. | 267/65 B |
| 3,025,076 | 3/1962 | Davies et al. | 267/65 B |

FOREIGN PATENT DOCUMENTS

| | | | |
|---|---|---|---|
| 446516 | 7/1927 | Fed. Rep. of Germany | 267/65 B |
| 44-26252 | 11/1969 | Japan | 267/65 B |

*Primary Examiner*—Douglas C. Butler
*Attorney, Agent, or Firm*—Craig & Burns

[57] ABSTRACT

A pneumatic spring for motor vehicles which includes two supports as well as closed spring volumes and two spring surfaces of different sizes which surfaces are subjected to pressure in opposite directions and which are variable as a function of road clearance. The surfaces are supported coaxially against one another with the spring volume being formed by two roll bellows defining a common chamber. Effective spring surfaces of the bellows facing away from each other are supported upon spring pistons of different diameters which are connected together. The spring pistons and a casing associated with the roll bellows form the two supports.

23 Claims, 5 Drawing Figures

PNEUMATIC SPRING FOR MOTOR VEHICLES

The present invention relates to a pneumatic or air spring for motor vehicles which includes two supports, a closed spring volume, and two coaxially supported spring surfaces of different sizes which are subjected to a compression in opposite directions with the spring surfaces acting opposite to one another and varying in effective size as a function of ride clearance of the vehicle.

A pneumatic or air spring of the aforementioned type is proposed in, for example, German Pat. No. 1021733, wherein two pleated bellows, which act against one another, are provided between which a support is provided and a frame is disposed which forms an auxiliary air volume with the second support being associated with the frame. The two pleated bellows, at sides located away from the first support, are connected to the frame as auxiliary air volumes so as to form a closed spring volume with the auxiliary air volume associated with the frame. Disadvantages of a spring volume of this type reside in the fact that a corresponding dynamization of the entire auxiliary air volume during dynamic operation is produced, depending upon the volumes of the pleated bellows, whereby corresponding phase shifts and inertias are produced.

The aim underlying the present invention essentially resides in providing a pneumatic or air spring which avoids the disadvantages of the prior art constructions and which achieves a zero-delay response.

According to advantageous features of the present invention, a spring volume is formed by two roll bellows which define a common chamber with effective spring surfaces of the bellows, facing away from one another, being supported against spring pistons each of which have a different diameter and which are connected to one another such that, on the one hand, the spring piston and, on the other hand, a casing associated with the roll bellows form the supports.

By virtue of the above-noted constructional features of the present invention, a direct equalization of volume takes place within the pneumatic or air spring so as to result in a zero-delay response and, consequently, a spring characteristic which is practically independent of the frequency. In particular, within the framework of the present invention, these properties can be achieved with a relatively small air volume so that a reduction in size of the spring can be achieved and satisfactory control possibilities for level control and damping are also obtained.

In addition to the above-noted advantages, due to a favorable positioning of the supports which is made possible by the present invention, additional important advantages are realized with respect to installation of the pneumatic or air spring with regard to not only space requirements but especially strength requirements.

In the construction of the pneumatic or air spring in accordance with the present invention, the roll bellows may be made in one piece. Moreover, the casing may be fashioned of a casing ring in a middle area between the effective spring surfaces with the casing ring tapering toward the smaller of the effective surfaces whereby a supporting force may be advantageously transferred to the roll bellows.

Advantageously, according to another feature of the present invention, the casing may also include sleeve guides for the roll bellows with the guides abutting the casing ring whereby, on the one hand, a force transmission may be further improved and, on the other hand, an exact guidance may be provided for the roll bellows. By virtue of the exact guidance, the unrolling characteristics of the roll bellows as well as the size of the effective spring surfaces as a function of travel may be favorably influenced. This influence can be obtained in a simple fashion by construction at least one of the guides abutting the ring of a conical configuration or a conical taper may be provided for the sleeve guides on both sides of the ring.

However, it is also advantageous in accordance with the present invention, especially for roll bellows with the smaller of the effective spring surfaces, starting at the casing ring, to provide a conical expansion of the sleeve guide whereby an improved fit may be achieved by virtue of a change in volume of the other roll bellows which has a larger effective spring surface. The different tapers of the sleeve guides, in accordance with the present invention, allows for a mutual balance of the volume behavior to be achieved in a simple fashion.

In accordance with another advantageous feature of the present invention, the sleeve associated with the roll bellows having the smaller effective spring surface is constructed as a closed bell with one of the supports being associated with the closed bell. This construction permits an installation of a support which is coaxial and located directly opposite the second support thereby producing especially favorable conditions with respect to the arrangement and acceptance of forces by the spring.

In accordance with an embodiment of the present invention, the closed bell may enclose a ventilated chamber opposite the smaller of the effective spring surfaces so that the chamber can effectively be used as a pump volume. Advantageously, the air volume accommodated in the ventilated chamber may be employed to cool the pneumatic or air spring whereby an external flow as well as an internal flow is made possible by providing an appropriate conduit or pipe connection.

To obtain additional damping effects, in accordance with the present invention, if desired, the chamber may be vented to the atmosphere with appropriate restrictions being provided at the vents.

To achieve a maximum possible spring volume with the smallest possible construction, in accordance with the present invention, at least one of the spring pistons may be closed so as to provide for an auxiliary volume adapted to be associated with the spring volume defined by the main chamber. Advantageously, the auxiliary volume may be communicated with the spring volume through at least one restriction means.

To achieve an abrupt spring stiffness or hardening when predetermined ride clearances are exceeded, in accordance with a still further feature of the present invention, if desired, the auxiliary volume may also be selectively connected to the spring volume as a function or in correspondence with a predetermined travel of the spring.

To advantageously provide for a structurally simple spring construction, according to the present invention, the spring pistons may be connected by a central tie rod which may be in the form of, for example, a tube or the like and may, for example, form a casing tube of a vibration damper or shock absorber so that a vibration damper is centrally integrated into the pneumatic or air spring.

Preferably, according to the present invention, the vibration damper is constructed as a hydraulic shock absorber whereby the interior of the spring piston can be associated with the hydraulic shock absorber as a cooling chamber.

In accordance with another embodiment of the present invention, the tubular tie rod may constitute a guide for a push rod whereby an axial telescoping guide is produced for the pneumatic or air spring with mutually displaceable ends of the telescoping guide being associated with the two spring supports.

According to a further embodiment of the present invention, an air spring damper may be integrated into the pneumatic or air spring. At least one restriction may be provided in a transitional region between the chamber parts associated with the roll bellows which restriction may be controlled, within the framework of the invention, as a function of a travel path of the spring and may be selectively connected or disconnected, if desired, as a function of spring travel.

In accordance with further advantageous features of the present invention, on the one hand, the restriction may remain essentially constant throughout a path of travel of the spring so that a conventional damping action superimposed on the pneumatic or air spring can be produced, comparable to that which is produced by, for example, an associated hydraulic shock absorber or vibration damper. On the other hand, the restrictions may be alterable or changeable with the travel path of the spring in such a manner that the restrictions are reduced toward ends of the path of travel. For this purpose, a limiting means may be obtained by providing a free or unobstructed through crosssections in a middle range and a blockage of the restrictions in the end ranges of the travel path with gradual transitions being provided so that a pneumatic pull-push stop arrangement is provided.

In accordance with another embodiment of the present invention, the restriction may be associated with a partition disposed in a vicinity of the casing ring and, in particular, in an abutting relationship with the casing ring. A travel-dependent control of the restriction can be achieved in accordance with the present invention in an especially simple fashion if central axial grooves are provided as restrictions, for example, associated with the tie rod which grooves are traversable.

To utilize the air spring of the present invention for vehicle levelling, a suitable control means may be provided for selectively controlling the pressure in the spring chamber.

Accordingly, it is an object of the present invention to provide a pneumatic spring for motor vehicles which avoids, by simple means, shortcomings and disadvantages encountered in the prior art.

A further object of the present invention resides in providing a pneumatic spring for motor vehicles which provides a zero-delay response.

Yet another object of the present invention resides in providing a pneumatic spring for motor vehicles which is substantially independent of frequency.

A further object of the present invention resides in providing a pneumatic spring for motor vehicles which has an improved force transmission and which provides for an exact guidance of effective spring surfaces.

A still further object of the present invention resides in providing a pneumatic spring for motor vehicles which functions with a relatively small air volume.

Another object of the present invention resides in providing a pneumatic spring for motor vehicles which is simple in construction and therefore inexpensive to manufacture.

Yet another object of the present invention resides in providing a pneumatic spring for motor vehicles which functions reliably under all operating conditions.

These and other objects, features, and advantages of the present invention will become more apparent from the following description when taken in connection with the accompanying drawings which show, for the purposes of illustration only, several embodiments in accordance with the present invention, and wherein.

Figure 1:
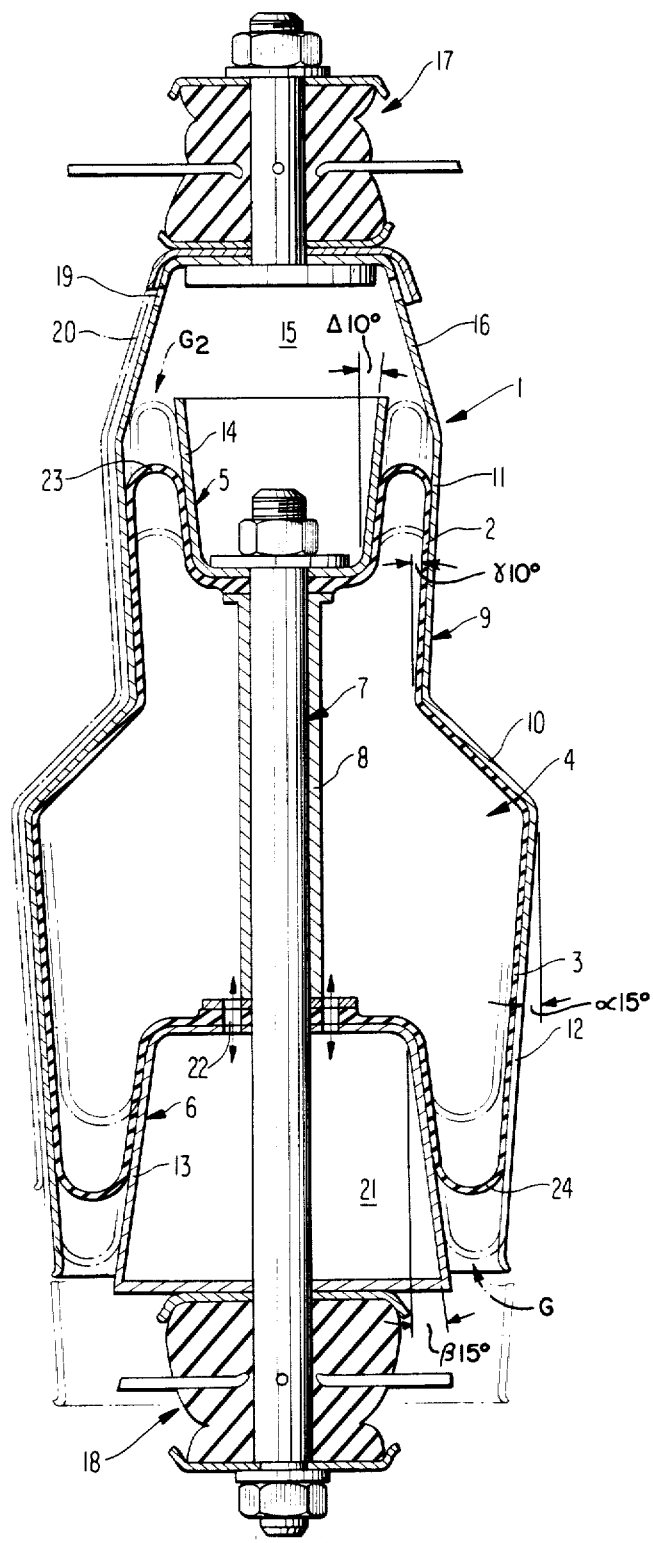
FIG. 1 is a longitudinal cross-sectional view of a first embodiment of a pneumatic spring in accordance with the present invention.

Referring now to the drawings wherein like reference numerals are used throughout the various views to designate like parts and, more particularly, to FIG. 1, according to this figure, a pneumatic or air spring generally designated by the reference numeral 1, includes two roll bellows 2, 3 with the roll bellows 2 having a smaller effective spring surface than the roll bellows 3. The two roll bellows 2, 3 define a common chamber generally designated by the reference numeral 4 which chamber 4 contains the spring volume. Cup-shaped spring pistons generally designated by the reference numerals 5, 6 support the ends of the respective roll bellows 2,3. The cup-shaped spring pistons 5, 6 are arranged so that a bottom wall of the respective pistons 5, 6 face the associated roll bellows 2, 3. The two cup-shaped spring pistons 5, 6 of the roll bellows 2, 3 are connected by a central tie rod generally designated by the reference numeral 7 extending through a central area of the chamber 4 inside of a spacing sleeve 8 located between the spring pistons 5, 6.

A casing generally designated by the reference numeral 9 is disposed externally of the roll bellows 2, 3 so as to enclose the roll bellows 2, 3. The casing 9 includes a casing ring 10 arranged in an area located between spring pistons 5, 6. The casing ring 10 tapers toward the smaller of the effective spring surfaces, that is, in the illustrated embodiment of FIG. 1, toward the cup-shaped spring piston 5.

As shown in FIG. 1, sleeves 11, 12 are arranged so as to abut respective sides of the conical casing ring 10. The sleeves 11, 12, as with the casing ring 10, are located concentrically with respect to the central tie rod 7 so as to result in a pneumatic or air spring construction 1 which is completely rotationally symmetrical.

The sleeve 12 extends from the casing ring 10 toward the larger of the effective spring surfaces, that is, in the illustrated embodiment of FIG. 1, toward the spring piston 6. The sleeve 12 tapers slightly conically from the casing ring 10 toward the spring piston 6 so that the sleeve 12 essentially defines a conical casing having a taper angle $\alpha$ of up to approximately 30°. The essentially cup-shaped piston 6 is disposed within the sleeve 12 and includes a cup wall 13 which is inclined slightly outwardly toward the sleeve 12. An annular groove generally designated by the reference character G is defined between the inner surface of the sleeve 12 and an outer surface of the cup wall 13. A roll bellows loop 24 of the roll bellows 3 lies or is accommodated in the annular groove G which tapers toward a free end of the sleeve 12. The cup wall 13 functions as an unrolling cone for the roll bellows 3. In accordance with the invention, the unrolling cone can also have a taper angle $\beta$ which may range up to approximately 30°. However, the angles $\alpha$ and $\beta$ illustrated in the drawings represent preferable dimensions.

In the construction of FIG. 1, the sleeve 11 extends toward the spring piston 5. The sleeve 11 is tapered slightly conically from the casing ring 10 toward the spring piston 5 associated with the smaller spring surface whereby the sleeve defines a conical casing having a taper angle $\gamma$ of up to 30°. The essentially cup-shaped piston 5 is disposed within the sleeve 11 and includes a cup wall 14 which is inclined slightly outwardly toward the sleeve 11. An annular groove generally designated by the reference character $G_2$ is disposed between the inner surface of the sleeve 11 and outer surface of the cup wall 14. A roll bellows loop 23 of the roll bellows 2 lies or is accommodated in the annular groove $G_2$. The cup wall 14 functions as an unrolling cone for the roll bellows 2. According to the present invention, the unrolling cone may have a taper angle $\Delta$ of approximately 30°, however, the angles $\gamma$ and $\Delta$ illustrated in the drawings represent preferable dimensions. The taper angles $\gamma$ and $\Delta$ have identical opening directions for the spring piston 5 and sleeve 11 while the taper angles $\alpha$ and $\beta$ have opposite opening directions for the sleeve 12 and spring piston 6.

In the construction of FIG. 1, the sleeve 11 is extended beyond the end of the spring piston 5 and terminates in a closed bell 16 disposed above the spring piston 5. The bell 16 encloses an air chamber 15 opposite the spring piston 5. The bell 16 is provided at a head or upper portion thereof with one pneumatic or air spring support means generally designated by the reference numeral 17. A second support means generally designated by the reference numeral 18 is disposed at an opposite end of the pneumatic or air spring 1. The second support means 18 is associated with the tie rod 7 and is mounted coaxially with respect to the spring piston 5. The tie rod 7 carries the second support 18 at an end opposite the spring piston 5 with the second support means extending out beyond the spring piston 6.

The bell 16 is provided with at least one vent opening 19 so as to permit atmospheric ventilation of the air chamber 15 and a corresponding cooling of the chamber 15. In order to fully utilize a pumping action which is produced within the air chamber 15 during movements of the pneumatic or air spring 1, and for the purpose of cooling the air spring 1, a hood-shaped cover 20 may be provided which surrounds casing 9 at least over a large part of the length thereof with a slight space being provided between the cover 20 and the casing 9.

According to the present invention, it is desirable for the pneumatic or air spring 1 to have the smallest possible volume and, accordingly, the chamber volume in the air spring 1 is constructed as small as possible. However, an indirect increase of the chamber volume can be achieved by the present invention in that the cup-shaped spring piston is sealed off from the outside and defines an air chamber 21 which is connected by holes or apertures 22 in a bottom wall of the piston 6, to the main chamber 4 so that the air chamber 21 in practice forms a portion of the total or main chamber value for the pneumatic or air spring 1.

The shape and size of the individual roll bellows loops 23, 24 of the respective roll bellows 2, 3 may be affected by the construction and/or disposition of the unrolling cones of the spring pistons 5, 6. In other words, by virtue of the tapering of the cup walls 13, 14 toward the taper of the surrounding sleeves 11, 12, a maximally exact balancing of the compressed volumes is achieved as the pneumatic or air springs 1 are compressed and expanded without static pressure changes. With reference to the construction shown in FIG. 1, this means that, for example, maximum compression is achieved in the compressed position and minimum compression in the extended position on the side of the smaller spring piston 5. The opposite characteristic is achieved in the larger spring piston 6 by virtue of the type of guidance provided there for the piston bellows loop 24.

Figure 2:
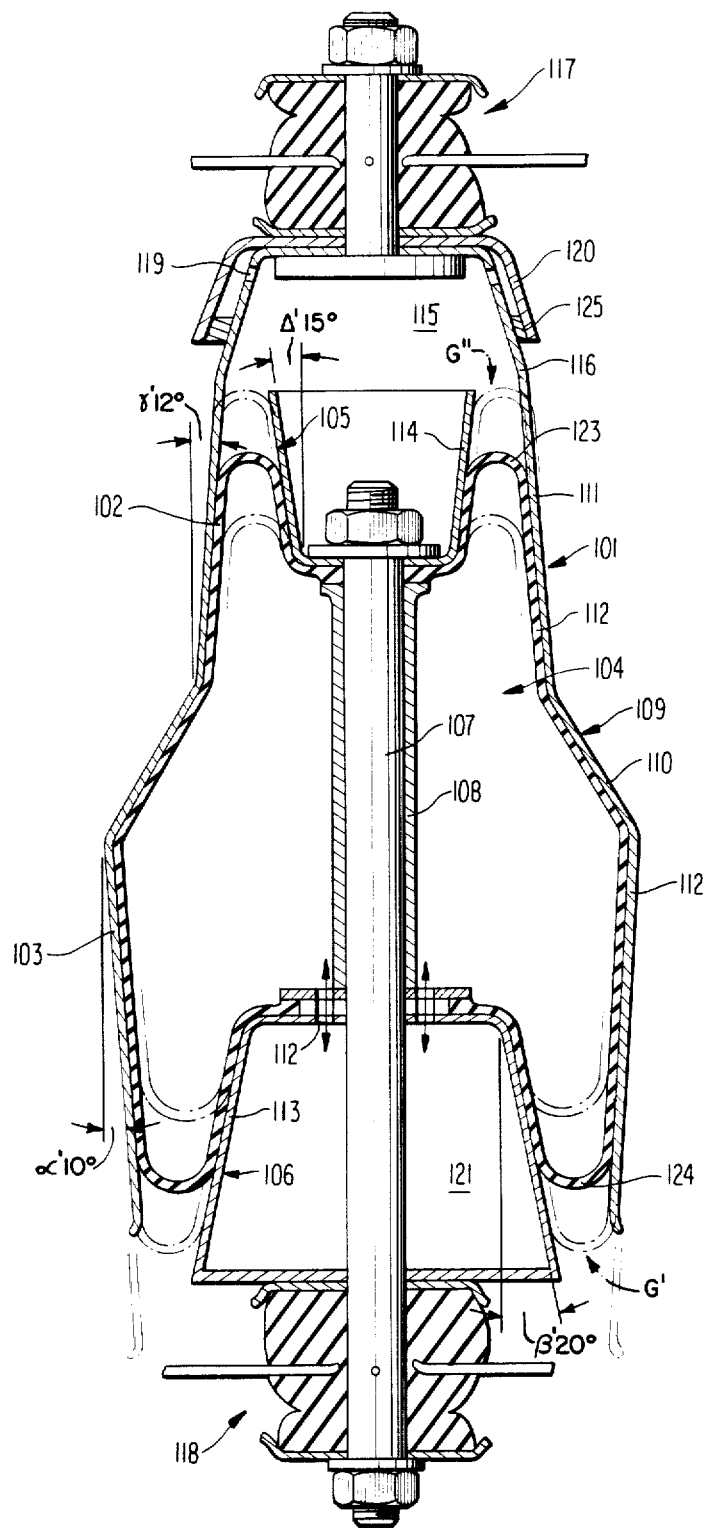
FIG. 2 is a longitudinal cross-sectional view of a second embodiment of a pneumatic spring in accordance with the present invention.

The pneumatic or air spring of FIG. 2 has essentially the same basic construction as that of FIG. 1 and hence the reference numerals for corresponding parts in both constructions have been increased by 100. According to FIG. 2, an air spring generally designated by the reference numeral 101 is provided which includes a smaller roll bellows 102 and a larger roll bellows 103 with the bellows 102, 103 defining a common main chamber 104. Cup-shaped spring portions generally designated by the reference numerals 105, 106 are arranged so that a bottom wall of the respective pistons 105, 106 face associated bellows 102, 103. A central tie rod 107 extends through the main chamber 104 inside a spacing sleeve 108 located between the pistons 105, 106 so as to connect the pistons 105, 106 to each other. A casing generally designated by the reference numeral 109 surrounds the roll bellows 102, 103 and includes a tapering casing ring 110 and sleeves 111, 112.

The sleeve 112 tapers slightly conically from the casing ring 110 toward the spring piston 106 so that the sleeve 112 essentially defines a conical casing have a taper angle $\alpha$ of up to approximately 30°. The cup-shaped piston 106 is disposed within the sleeve 112 and includes a cup wall 113 which is inclined slightly outwardly toward the sleeve 112 so as to define an annular groove generally designated by the reference character G' between an inner surface of the sleeve 112 and an outer surface of the cup wall 113. A roll bellows loop 124 of the roll bellows 103 lies or is accommodated in the annular groove G' which tapers toward a free end of the sleeve 112. The cup wall 113 functions as an unrolling cone for the roll bellows 103 with the unrolling cone also having a taper angle of $\beta'$ up to approximately 30°. However, the angles $\alpha'$ and $\beta'$ illustrated in the drawings represent preferable dimensions.

The sleeve 111 is tapered slightly conically from the ring casing 110 toward the spring piston 105 and defines a conical casing having a taper angle γ' of up to 30°. The piston 105 is disposed within the sleeve 111 and includes a cup wall 114 which is inclined slightly outwardly toward the sleeve 111. An annular groove generally designated by the reference character G" is defined between an inner surface of the sleeve 111 and an outer surface of the cup wall 114 with a roll bellows loop 123 lying in or being accommodated in the annular groove G". The cup wall 114 functions as an unrolling cone for the roll bellows 102 and can have a taper angle of Δ' up to approximately 30°. However, the angles γ' and Δ' illustrated in the drawings represent preferable dimensions.

In contrast to the construction of FIG. 1, in the arrangement of FIG. 2, the sleeve 111 is inclined oppositely to the sleeve 11 and extends toward the wall 114 of the spring piston 105 which is surrounded by the sleeve 111. As a result of such an arrangement, definite pressure variations, although relatively small ones, are produced based upon the air spring as a whole as a function of the spring travel since the differences in volume which are produced during a spring action between the upper roll bellows 102 and the lower roll bellows 103 can no longer be fully compensated. However, the casing 109 is especially advantageous from a manufacturing point of view and makes possible a favorable acceptance of forces and their transmission especially to the support 117 which abuts the bell 116.

Moreover, the air chamber 115 may serve not only as a pump chamber but also function to provide a damping action. For this purpose, rather than provide ventilating openings 19, throttle bores 119 of a relatively large cross-section are provided in the bell 116. The air chamber 115 communicates with the atmosphere by way of the throttle bores 119 and the upper part of the bell 116 is provided with a hood-shaped cover 120 which functions to protect the throttle bores 119 against dust or the like. A filter ring 125 may be provided to prevent access to the interior of the hood-shaped cover 120 thereby maintaining contaminants out of the throttle bores 119.

Figure 3:
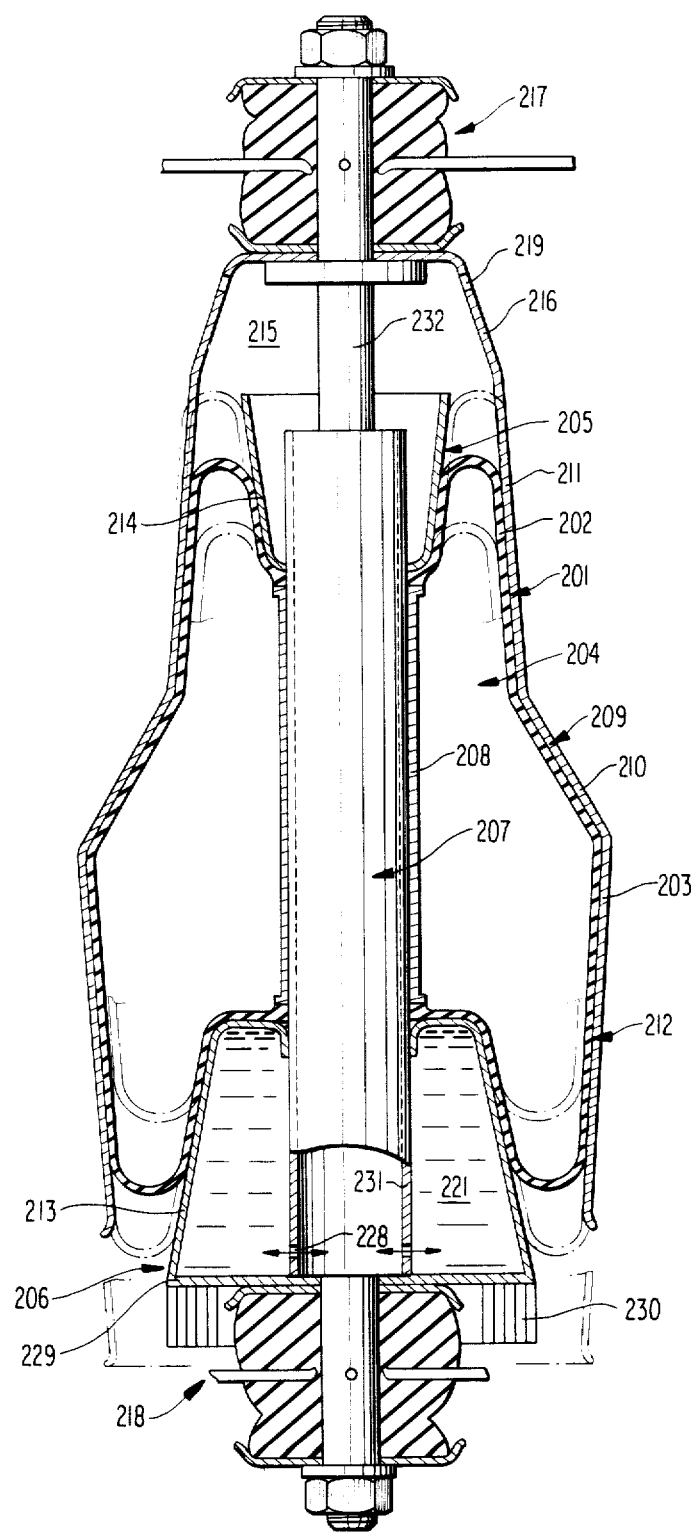
FIG. 3 is a longitudinal cross-sectional view of a third embodiment of a pneumatic spring in accordance with the present invention.

The construction in FIG. 3 corresponds, in principle, to the construction if FIG. 2; therefore, the reference numerals for corresponding parts in these constructions have been increased by 200. Moreover, for the sake of clarity, the respective elements will further be described to the extent necessary for a direct explanation of the construction of FIG. 3.

As shown in FIG. 3, the tie rod generally designated by the reference numeral 207 is in the form of a single-tube hydraulic shock absorber associated with an external auxiliary volume provided in a closed interior space 221 of the larger cup-shaped spring piston 206. A transition or communication from an interior chamber 221 to the lower damping chamber of the single-tube hydraulic shock absorber, which forms the tie rod 207, is accomplished by way of bores 228. Interior chamber 221, closed at the bottom by way of a bottom plate 229 may also be provided with cooling ribs 230 mounted outside on the bottom plate 229.

A casing tube 231 of the hydraulic shock absorber is provided as a true tie rod 207 inside the spacing sleeve 208. As is conventional in hydraulic shock absorbers, a piston rod 232 extends above the casing tube 231 at the top thereof with the rod 232 being fixed with respect to the bell 216 and being connected with support 217 to its part located outside the bell 216. By means of the shock absorber which, in the construction of FIG. 3, simultaneously constitutes the tie rod 207, additional centering and guidance for the pneumatic or air spring 201 is readily achieved.

Figure 4:
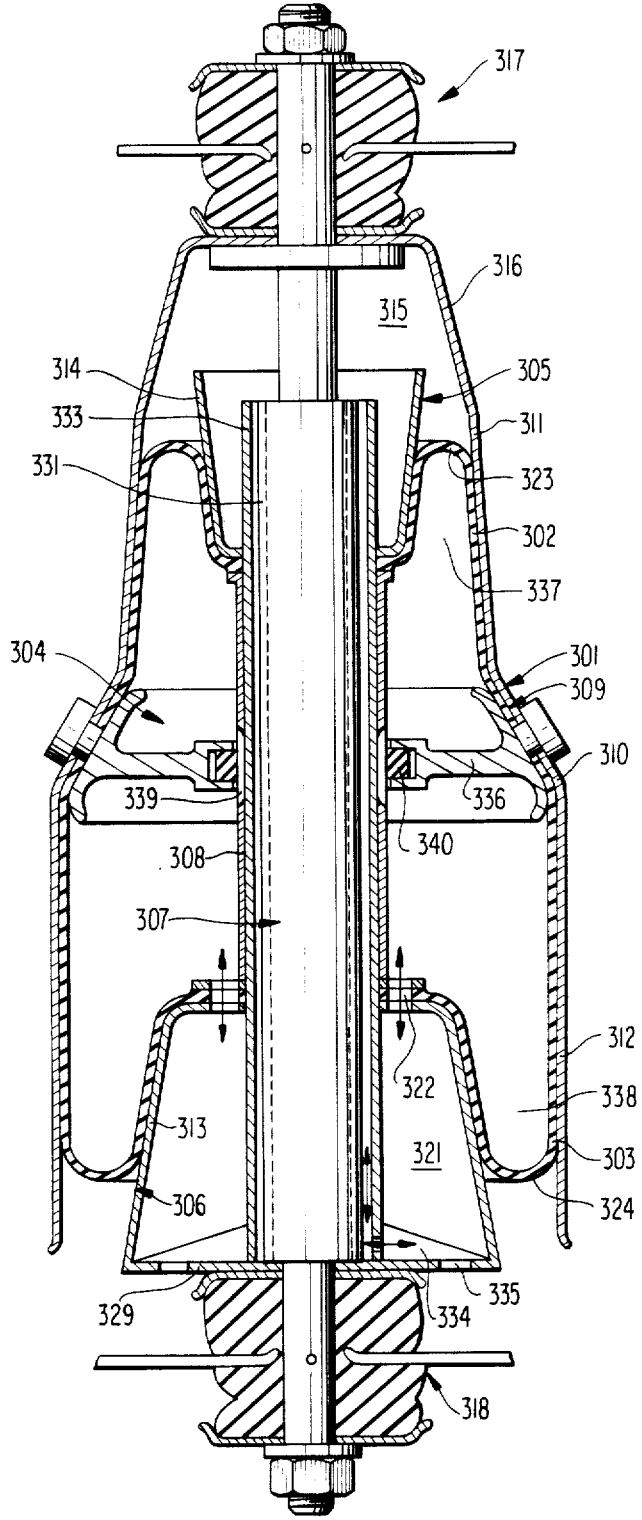
FIG. 4 is a longitudinal cross-sectional view of yet another embodiment of a pneumatic spring in accordance with the present invention with a pneumatic pull-push stop delimination.

As shown in FIG. 4, a pneumatic spring generally designated by the reference numeral 301 is provided which includes a tie rod generally designated by the reference numeral 307 formed, as with the construction of FIG. 3, by a single-tube hydraulic shock absorber with which, in this case, is associated a gas cushion in a conventional manner not shown in detail in the drawings. A casing tube 331 of the hydraulic shock absorber is surrounded by a sleeve tube 333 whereby the sleeve tube 333 and the casing tube 331 define an annular channel extending from air chamber 315 through the spring piston generally designated by the reference numeral 306 with the channel communicating at a bottom end thereof with the atmosphere. To achieve such communication, in a lower area of the bottom plate 329, an annular chamber 334 is defined between a lower portion of the air chamber 321 and a bottom plate 329. The annular chamber 334 communicates with the atmosphere by way of ventilating opening 335 disposed above the bottom plate 329 and located radially outside support 318. Air chamber 315, enclosed by the bell 316, is closed off in the vicinity of the bell 316 and communicates with the atmosphere only by way of the annular shape or channel defined between the casing tube 331 and sleeve tube 333. A pumping action which takes place in the air chamber 315 produces cooling of both of the casing 331 and hence of the shock absorber filling as well as the air volume of the pneumatic spring 301 by way of the casing tube 333. A pull-push stop limit is shown in FIG. 4 which is integrated into the pneumatic spring 301 and associated therewith. A partition 336 is provided in a vicinity of a casing ring 310 with the partition being axially displaceable relative to the sleeve tube 333 during a movement of the pneumatic spring. The partition 336, spacing sleeve 308, and sleeve tube 333 are then connected in such a manner that the connection between the two partial volumes 337, 338 of the main chamber 304, associated with roll bellows 302, 303, may be closed off toward the end positions of the spring travel path. To accomplish this, according to the invention, the spacing sleeve 308, which surrounds sleeve tube 333, is associated with axial grooves 339 in that lengthwise region which is located adjacent to the partition 336 when the pneumatic spring 301 is in a central position. The axial grooves are gradually closed off by an O-ring 340 associated with the partition 336 during the course of travel movements of the spring 301 so that toward the end positions of the path of movement of the spring 301, volume portions 337 and 338 are cut off completely from each other and an extreme hardening of the spring is achieved toward these end positions.

The air chamber 321 is provided as an auxiliary air volume for the pneumatic spring 301. It can be particularly advantageous in conjunction with the arrangement of the partition 336 to provide an additional delimitation of the additional air volume toward the lower end position as well from the chamber volume 304. For this purpose, in conjunction with the partition 336, if desired, the O-ring 340 can be made so as to block bores 322. However, for this purpose, an additional O-ring (not shown) may be provided which follows a travel path of the spring 301 and is controlled as a function of its travelling movements.

Figure 5:
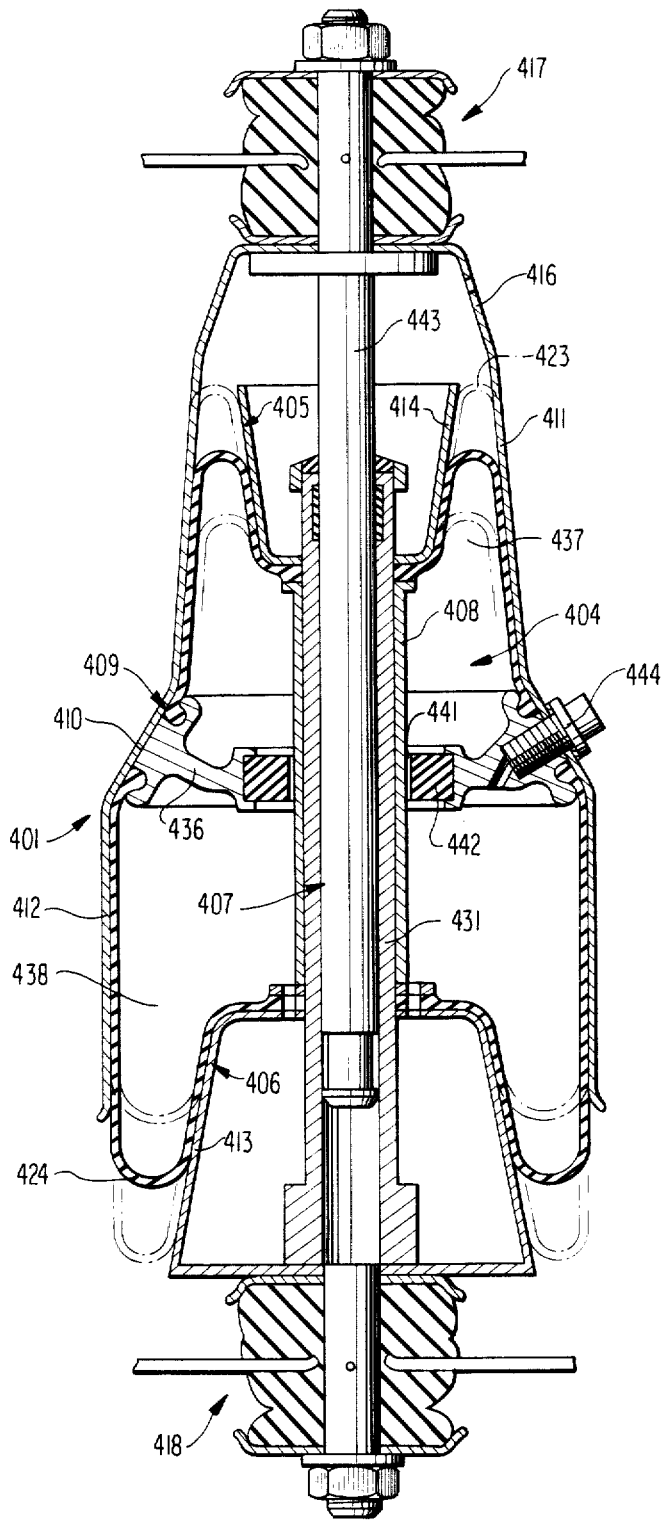
FIG. 5 is a longitudinal cross-sectional view of a further embodiment of a pneumatic spring in accordance with the present invention with integrated pneumatic spring damping and levelling.

A further embodiment of a pneumatic or air spring is shown in FIG. 5 with a gas damping unit being integrated into the pneumatic spring itself. The gas damping unit may be combined, if desired, within the framework of the invention with a hydraulic damping or shock absorber of the type described hereinabove.

The basic construction of the pneumatic spring of FIG. 5 essentially corresponds to that of the previous constructions and, consequently, the reference numerals of corresponding parts of the constructions have been increased by 400. The damping can be effected in the construction of FIG. 5 and is structurally similar to the end position delimitation in the construction of FIG. 4 whereby, in the type of damping provided in FIG. 5, however, free travel about a central position must be avoided.

More particularly, in the construction of FIG. 5, a partition 436 is provided which defines with spacing sleeve 408 and annular element 442 an annular groove or space 441 which passes or extends centrally through the pneumatic or air spring generally designated by the reference numeral 401. The annular element 442 is disposed or accommodated in the partition 436 proper with the annular element 442 making it possible to determine, in a simple manner, the width of the annular groove or space 441 formed between an inner surface of the element 442 and an outer surface of the spacer sleeve 408. As readily apparent, in lieu of the annular groove or space 441, separate throttle bores (not shown) may be provided. By constructing the spacer sleeves 408 so as to taper slightly conically outwardly from a center portion to respective end portions thereof, it is possible, as with the construction of FIG. 4, to completely block volume portions 437, 438 of the main chamber generally designated by the reference numeral 404 with respect to one another toward end positions of the path of travel of the pneumatic spring 401 so that a stiffening or hardening of the spring 401 is produced at such end positions in addition to a throttling action.

In the arrangement of FIG. 5, a tie rod generally designated by the reference numeral 407 is constructed as a solid telescoping axial guide which includes a casing tube 431 fixed with respect to spring pistons generally designated by the reference numerals 405 and 406. A guide rod 443 is guided for lengthwise displacement within the casing tube 431 with the guide rod 443 being arranged so that an upper support generally designated by the reference numeral 417 abuts the bell 416 while a lower support generally designated by the reference numeral 418 is associated with an axial extension of the casing tube 431.

To provide for the possibility of load levelling of the motor vehicle, as also shown in FIG. 5, a load valve 444 may be disposed in a vicinity of a casing ring 410 with a filling pressure of the pneumatic or air spring 401 being adjustable by the load valve 444. The load valve 444 may be connected by way of suitable lines or conduits (not shown) to, for example, a compressed air supply of the motor vehicle.

While I have shown and described several embodiments in accordance with the present invention, it is understood that the same is not limited thereto but is susceptible to numerous changes and modifications as shown to one having ordinary skill in the art, and I therefore do not wish to be limited to the details shown and described herein, but intend to cover all such modifications as are encompassed by the scope of the appended claims.

I claim:

1. A pneumatic spring for motor vehicles which includes two supports, at least one closed spring volume, two spring surfaces of different sizes which are adapted to be subjected to pressure in opposite directions, the two spring surfaces each having an effective spring surface which is variable as a function of road clearance of the vehicle, and means for supporting the spring surfaces so as to be coaxial with respect to one another, characterized in that a casing is provided, two roll bellows are arranged in the casing and form the spring surfaces, the two roll bellows defining a common chamber forming at least a portion of the spring volume of the pneumatic spring, the supporting means includes a pair of spring piston means associated with the respective roll bellows, the spring piston means having different diameters and providing support for the respective bellows on sides of the effective spring surfaces which face away from each other, means are provided for connecting the spring piston means together, and in that the spring piston means and the casing of the pneumatic spring form a portion of the two supports.

2. A pneumatic spring according to claim 1, characterized in that the two roll bellows are made in one piece.

3. A pneumatic spring according to claim 1, characterized in that the casing includes a casing ring arranged in a middle region of the pneumatic spring between the effective spring surfaces, the casing ring tapering toward a smaller one of the two effective spring surfaces.

4. A pneumatic spring according to claim 3, characterized in that the casing further includes at least two sleeve guide means respectively associated with the roll bellows, said sleeve guide means being arranged so as to respectively be in an abutting relationship with an upper and lower end of the casing ring.

5. A pneumatic spring according to claim 4, characterized in that at least one of the sleeve guide means tapers conically in an abutting area with the casing ring.

6. A pneumatic spring according to claim 4, characterized in that at least one of the sleeve guide means tapers conically outwardly from an area of abutment with the casing ring.

7. A pneumatic spring according to claim 6, characterized in that the guide sleeve means associated with the roll bellow having the smaller of the two effective spring surfaces includes a closed bell portion operatively associated with one of the two supports.

8. A pneumatic spring according to claim 7, characterized in that the two supports are located coaxially opposite to one another.

9. A pneumatic spring according to claim 8, characterized in that the closed bell portion defines an air chamber opposite the smaller of the two effective spring surfaces, and in that means are provided for venting the air chamber to the atmosphere.

10. A pneumatic spring according to claim 9, characterized in that the air chamber is disposed such that a displacement of the pneumatic spring results in a pumping of air from the chamber with the chamber defining a pump volume.

11. A pneumatic spring according to claim 9, characterized in that the spring piston means have an open cup-shaped configuration, and in that means are provided for closing one of said spring piston means so as to define an auxiliary spring volume chamber.

12. A pneumatic spring according to claim 11, characterized in that means are provided for communicating the auxiliary spring volume chamber with the common chamber.

13. A pneumatic spring according to one of claims 10 or 12, characterized in that means are provided for guiding the air pumped from the air chamber to the exterior of the pneumatic spring so as to cool the same.

14. A pneumatic spring according to claim 8, characterized in that said means for connecting the spring piston means together includes a central tie rod means.

15. A pneumatic spring according to claim 1, characterized in that said means for connecting the spring piston means together includes a central tie rod means.

16. A pneumatic spring according to claim 1, characterized in that means are provided for effecting a cooling of an exterior of the pneumatic spring.

17. A pneumatic spring according to claim 1, characterized in that each of the spring piston means has an essentially open cup-shaped configuration with a bottom wall and an annular side wall, the bottom wall being disposed so as to support a portion of an associated roll bellows, said side walls of each of said spring piston means tapering conically outwardly from the bottom wall so as to form an unrolling cone for an associated roll bellows, and in that the casing includes a casing ring arranged in a middle region of the pneumatic spring between the effective spring surfaces of the respective roll bellows, the casing ring tapering toward a smaller one of the two effective spring surfaces, and at least two sleeve guiding means for the respective roll bellows, said sleeve guiding means arranged so as to be in an abutting relationship with an upper and lower end of the casing ring.

18. A pneumatic spring according to claim 17, characterized in that an annular groove is formed between the side walls of the respective spring piston means and an adjacent one of said guide sleeve means for accommodating a loop of the respective roll bellows.

19. A pneumatic spring according to claim 18, characterized in that the guide sleeve means abutting an upper end of the casing ring tapers conically outwardly from the area of the abutment with the casing ring, and in that the guide sleeve means abutting a lower end of the casing ring tapers conically inwardly from the area of abutment with the casing ring.

20. A pneumatic spring according to one of claims 18 or 19, characterized in that a closed bell portion is provided at the guide sleeve means abutting an upper end of the casing ring, the closed bell portion being operatively associated with one of the two supports.

21. A pneumatic spring according to claim 20, characterized in that the closed bell defines an air chamber opposite the smaller of the effective spring surfaces, and in that means are provided for venting the air chamber to the atmosphere.

22. A pneumatic spring according to claim 21, characterized in that means are provided for closing one of said spring piston means so as to define an auxiliary spring volume chamber.

23. A pneumatic spring according to claim 22, characterized in that means are provided for communicating the auxiliary spring volume chamber with the common chamber.

* * * * *